Oct. 11, 1932.    R. W. LEACH    1,882,287
VALVE OR COCK
Filed Sept. 6, 1927

R. W. Leach
INVENTOR

UNITED STATES PATENT OFFICE

ROBERT WILLIAM LEACH, OF NEWPORT, ENGLAND, ASSIGNOR TO AUDLEY ENGINEERING COMPANY LIMITED, OF NEWPORT, ENGLAND

VALVE OR COCK

Application filed September 6, 1927, Serial No. 217,805, and in Great Britain November 8, 1926.

This invention relates to valves or cocks of the rotatable plug type, and has for its object to provide an improved construction whereby lubrication can be effected automatically in a simple and reliable manner.

The invention comprises the employment of a cylindrical plug arranged within a corresponding chamber in the body and adapted to receive, in addition to the normal rotational movements for opening and closing the communicating passages in the body, a gradual axial movement under the pressure of the fluid controlled by the valve, or by a spring, this latter movement being utilized to express lubricant from a reservoir and so maintain adequate lubrication of the contiguous surfaces of the plug and body.

In the accompanying sheet of explanatory drawing:—

Figure 2:
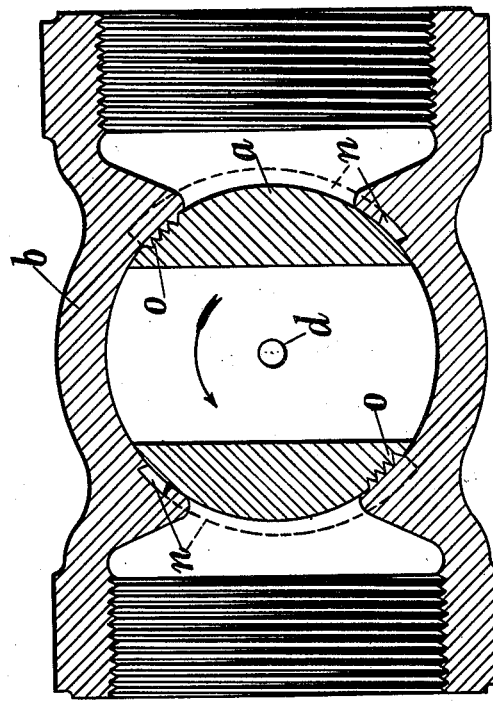
Figure 3:
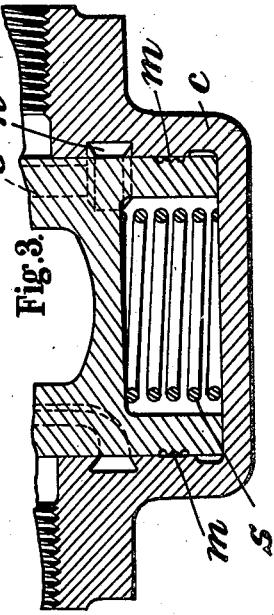
Figure 1:
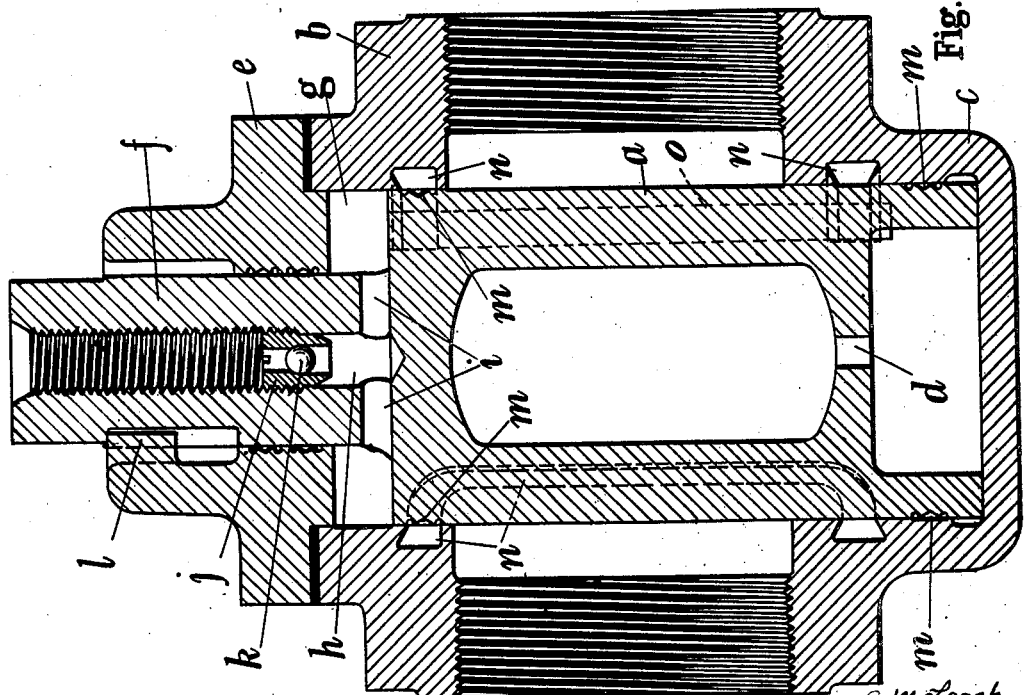

Figure 1 is a sectional side elevation, Figure 2 is a sectional plan of a cock or valve constructed in accordance with this invention, and Fig. 3 is a fragmentary sectional view similar to Fig. 1 showing a modification of the invention.

In carrying the invention into effect as shown, the main portion of the plug $a$ is made of cylindrical form, and is accommodated in a cylindrical chamber in the body part $b$. Both the body and the plug are formed with the usual passages which are controlled by rotational movement of the plug. One end of the plug is enclosed by a cover piece $c$ made integrally with the body, and, by means of an aperture $d$ in the plug communicating with the main passage, pressure fluid is admitted to this end of the plug when the cock or valve is open.

The opposite end of the plug is enclosed by a removable gland $e$ on the body through which projects the plug actuating stem $f$, and between this end of the plug and the adjacent portion of the body is arranged a space $g$ which serves as a lubricant reservoir. The reservoir may be charged through axial and transverse passages $h$, $i$, in the stem, the axial passage being closed by a plug $j$. The said passage may also contain non-return valve $k$. The stop $l$ engaging a shouldered recess in the stem serves to limit the extent of rotational movement. Longitudinal grooves $o$ are arranged in the plug, to permit the distribution of lubricant from the reservoir over the contiguous surfaces of the plug and body. The lubricant serves not only to preserve the proper condition of such surfaces, but also provides a tight seal for preventing leakage of pressure fluid past the plug. Also circumferential grooves $m$ are provided on the plug, these receiving lubricant from the grooves $o$. In the construction shown, additional and relatively deep grooves $n$ are provided in the body, adjacent to the inlet and outlet apertures, these being also supplied from the longitudinal grooves communicating with the reservoir $g$.

Under the action of the pressure fluid on the end of the plug opposite the reservoir a very gradual axial movement is imparted to the plug which causes a pressure to be exerted on the lubricant in the reservoir and ensures automatic maintenance of the lubricant at the working surfaces. Instead of or in addition to fluid pressure, that of a spring $s$ or other suitable means may be used. The total amount of movement ordinarily required is not large, as the reservoir is periodically recharged with lubricant, but to avoid throttling of the main passage through the valve by the transverse or axial displacement of the plug, the width of the passage in the latter may be made greater than that in the plug.

Rotation of the plug is limited to movement through 90° in such direction that the grooves $o$ do not become exposed to the fluid controlled by the valve, thereby ensuring that lubricant does not escape from the grooves $o$ into the fluid passages of the valve. The grooves $n$ only partially surround the fluid ports in the valve body, and are arranged to receive lubricant from the grooves $o$ when the valve is in the closed position, the ends of the grooves $n$ then joining up with the grooves $o$ and completely surrounding the fluid ports with lubricant grooves. The grooves $o$ may be arranged in the body to communicate with the lubricant reservoir $g$ and the grooves $n$ arranged in the plug.

The invention is not limited to any particular mechanical or constructional details as these may be varied to suit different requirements.

Having thus described my invention what I claim as new and desire to secure by Letters Patent is:—

1. In valves or cocks of the rotatable plug type, the combination comprising a cylindrical body part, a cylindrical plug which is both rotatable and slidable within the body part, a lubricant reservoir located between one end of the plug and the body part, and lubricant distributing passages, and means located at the other end of the plug adapted to be acted upon by a pressure to slide said plug against the lubricant in said reservoir the lubricant being expelled from the reservoir to the passages by the sliding movement of the plug, substantially as set forth.

2. In rotatable plug cocks or valves, the combination comprising a cylindrical body part, a cylindrical plug rotatable and slidable within the body part, a cylindrical extension passing through the body part at one end of the plug, means whereby pressure fluid controlled by the plug can be admitted to the end of the plug opposite the extension to cause the plug to move endwise under said pressure, a lubricant reservoir arranged in the body adjacent to the end of the plug provided with the aforesaid extension, and lubricant distributing passages communicating with the reservoir, substantially as set forth.

3. In valves or cocks of the type claimed in claim 1 in which the means includes a chamber formed by the end of the plug and the body part and means communicating with the pressure fluid of the line to produce pressure in said chamber to move said plug.

4. In combination in a valve, a casing or body having a cylindrical bore and a transverse passage for fluid, a valve shell or plug mounted for rotation in the bore and also for longitudinal movement therein, and unbalanced, so that the pressure of the fluid tends to move said plug endwise in the bore, a lubricant chamber being provided between a part of the plug and the body, so that said endwise movement of the plug tends to feed the lubricant from said chamber, and means for conducting the lubricant from the chamber to the rubbing surfaces between the plug and bore.

5. In combination in a valve, a casing or body having a cylindrical bore and a transverse passage for fluid, a valve shell or plug mounted for rotation in the bore and also for longitudinal movement therein, and having a disc at one extremity fitting said bore and a ring at the other extremity fitting the bore, so that the valve shell is unbalanced and tends to move endwise under the fluid pressure in the casing, a lubricant chamber being provided between the disc and the end of the bore, and means for conducting the lubricant from the chamber to the rubbing surfaces between the bore and plug.

6. In combination in a valve, a casing or body having a cylindrical bore and a transverse passage for fluid, a valve shell or plug mounted for rotation in the bore and also for longitudinal movement therein, and unbalanced so that the pressure of the fluid tends to move said plug endwise in the bore, a lubricant chamber being provided between a part of the plug and the body, so that said endwise movement of the plug tends to feed the lubricant from said chamber, means for conducting the lubricant from said chamber to the rubbing surfaces between the plug and bore, and a connection provided with a check valve whereby lubricant under pressure may be forced into said chamber to recharge it.

7. In combination in a valve, a casing or body having a cylindrical bore and a transverse passage for fluid, a valve shell or plug mounted for rotation in the bore and also for longitudinal movement therein, and having a disc at one extremity fitting said bore and a ring at the other extremity fitting the bore, so that the valve shell is unbalanced and tends to move endwise under the fluid pressure in the casing, a lubricant chamber being provided between the disc and the end of the bore, means for conducting the lubricant from the chamber to the rubbing surfaces between the plug and bore, means for supplying lubricant under pressure to said chamber to recharge it.

8. In combination in a valve, casing or body having a cylindrical bore and a transverse passage for fluid, a valve shell or plug mounted for rotation in the bore and also for longitudinal movement therein, a lubricant chamber being provided between a part of the plug and the body, so that said endwise movement of the plug tends to feed the lubricant from said chamber, a spring arranged to apply force to the plug tending to move it endwise and feed the lubricant from said chamber, and means for conducting the lubricant from the chamber to the rubbing surfaces between the plug and bore.

9. In a valve, a casing, an unbalanced plug mounted for rotation in the casing adapted to be moved by the internal pressure in the valve, a lubricant chamber at one end only, and means to distribute lubricant from said lubricant chamber between the plug and the casing.

10. In a valve, a casing, an unbalanced plug mounted for rotation in the casing adapted to be moved by the internal pressure in the valve, a lubricant chamber at one end only, means to distribute lubricant from said lubricant chamber between the plug and the casing, and a stem on said plug extending through the casing to the outside thereof, said stem being located on one end only.

11. In a lubricated valve, a casing containing a pool of lubricant at one end, a cylindrical plug adapted to be moved by the internal pressure in the valve against said pool of lubricant, and means for distributing from said lubricant pool lubricant between the casing and the plug.

12. In a lubricated valve, a casing, a plug of unbalanced construction adapted to be moved by the internal pressure in the line, a lubricant chamber at one end only between the plug and the casing, whereby the internal line pressure on the valve will move it against the lubricant in the lubricant chamber and in that direction only, and means to distribute lubricant from the chamber between the plug and casing around the end of the plug opposite the lubricant chamber.

13. In valves or cocks of the rotatable plug type, the combination comprising a body part provided with a cylindrical bore, a cylindrical plug which is both rotatable and slidable within said bore, a lubricant reservoir located between one end of the plug and the body part, and means on the plug adapted to receive a pressure to cause the plug to be urged against the lubricant in said reservoir, the lubricant being expelled from the reservoir to the passages by the movement of the plug caused by said pressure.

14. In valves or cocks of the rotatable plug type, the combination comprising a body part provided with a cylindrical bore, a cylindrical plug which is both rotatable and slidable within said bore, a lubricant reservoir located between one end of the plug and the body part, lubricant distributing passages in the valve working surfaces, means for directing pressure fluid controlled by the valve against a part of the plug to cause the plug to be urged by said fluid against the lubricant in the reservoir, the lubricant being expelled from the reservoir to the passages by the sliding movement of the plug.

15. In valves or cocks of the rotatable plug type, the combination comprising a body part provided with a cylindrical bore, a cylindrical plug which is both rotatable and slidable within said bore, a lubricant reservoir located between one end of the plug and the body part, lubricant distributing passages in the valve working surfaces, and a spring located between the other end of the plug and the body part to urge the plug against the lubricant in said reservoir, the lubricant being expelled from the reservoir to the passages by the sliding movement of the plug under the urge of said spring, substantially as set forth.

In testimony whereof I have signed my name to this specification.

ROBERT WILLIAM LEACH.